United States Patent [19]

Collins et al.

[11] 4,155,836

[45] May 22, 1979

[54] HYDROCARBON REFORMING PROCESS WITH SULFUR SENSITIVE CATALYST

[75] Inventors: Thomas A. Collins, Olympia Fields; Andrew P. Voss, South Holland, both of Ill.

[73] Assignee: Atlantic Richfield Company, Philadelphia, Pa.

[21] Appl. No.: 810,238

[22] Filed: Jun. 27, 1977

[51] Int. Cl.$^2$ .................. C10G 35/08; B01J 23/96; B01J 21/20

[52] U.S. Cl. .................. 208/139; 208/140; 252/411 S; 252/415

[58] Field of Search ............ 252/415, 411 S; 208/139, 140

[56] References Cited

U.S. PATENT DOCUMENTS

| | | | |
|---|---|---|---|
| 2,737,477 | 3/1956 | Hemminger | 208/140 |
| 2,885,345 | 5/1959 | Hemminger et al. | 208/140 |
| 3,573,199 | 3/1971 | McCoy | 208/139 |

FOREIGN PATENT DOCUMENTS 598165  5/1960 Canada ..................... 208/139

Primary Examiner—Winston A. Douglas
Assistant Examiner—P. E. Konopka
Attorney, Agent, or Firm—Frank J. Uxa; Stanley M. Welsh

[57] ABSTRACT

An improved process minimizing the detrimental effects caused by inadvertently contacting a high sulfur, high water-containing hydrocarbon feedstock with a platinum group metal, halogen-containing catalyst is disclosed. The present process involves discontinuing the high sulfur, high water-containing feedstock-catalyst contacting while passing hydrogen over the catalyst. The catalyst halogen concentration is maintained or increased by the addition of halogen component, for example, during the hydrogen pass through. Once the sulfur contamination has been removed from the catalyst, normal hydrocarbon reforming is resumed.

12 Claims, No Drawings

HYDROCARBON REFORMING PROCESS WITH SULFUR SENSITIVE CATALYST

This invention relates to a new and improved hydrocarbon reforming process. More particularly, the invention relates to an improved process which involves utilizing a catalyst comprising at least one platinum group metal and at least one halogen component to promote reforming of a hydrocarbon feedstock.

The use of catalysts comprising minor amounts of at least one platinum group metal and at least one halogen component on a major amount of porous support, e.g., alumina, to promote hydrocarbon reforming is well known. One disadvantage of using such a catalyst in hydrocarbon reforming is the high sensitivity such catalysts have to sulfur in the hydrocarbon feedstock. Special precautions are often necessary to provide a hydrocarbon feedstock having a suitably low sulfur concentration. For example, hydrocarbon reforming feedstocks may be subjected to conventional processing, e.g., hydrodesulfurization, stripping, distillation and/or other techniques, to reduce sulfur concentration. In spite of these measures, hydrocarbon having an excessively high sulfur concentration may inadvertently come into contact with the catalyst and cause a rapid and substantial, and often permanent, decrease in valuable catalytic activity. Processing upsets in the equipment used to reduce the sulfur concentration of the hydrocarbon feedstock can lead to such high sulfur feedstock-catalyst contact and its resultant problems. The problems caused by such high sulfur feedstock-catalyst contact should desirably be minimized.

Therefore, one of the objects of the present invention is to provide an improved process for hydrocarbon reforming employing a catalyst including at least one platinum group metal and at least one halogen component.

Another object of the present invention is to provide a process for reducing the detrimental effects on a hydrocarbon reforming process employing a catalyst including at least one platinum group metal and at least one halogen component caused by contacting such catalyst with a feedstock containing a high sulfur concentration.

A still further object of the present invention is to provide a process for reducing the detrimental effects on a hydrocarbon reforming process employing a catalyst including at least one platinum group metal and at least one halogen component caused by contacting such catalyst with a feedstock containing high sulfur and water concentrations. Other objects and advantages of the present invention will become apparent hereinafter.

An improved process has been found wherein hydrocarbon is contacted with a catalyst comprising a major amount of a porous solid support, e.g., alumina, a minor, catalytically effective amount, preferably about 0.01% to about 3.0% by weight, of at least one platinum group metal and a minor, catalytically effective amount, preferably about 0.1% to about 5% by weight, of at least one halogen component in the presence of hydrogen at reforming conditions. The improved process comprises:

(1) contacting a hydrocarbon feed with a catalyst, as described hereinabove, in the presence of hydrogen in at least one reaction zone at hydrocarbon reforming conditions; the hydrocarbon feed containing less than about 8 ppm. by weight of sulfur, and preferably less than about 20 ppm. by weight of water;

(2) contacting a hydrocarbon material having an undesirably high concentration of sulfur, preferably at least about 10 ppm. by weight of sulfur and at least about 50 ppm. by weight of water, in the reaction zone with the catalyst in the presence of hydrogen at reforming conditions to produce further reformate product and cause the catalyst to be contaminated with an excessive amount of sulfur;

(3) discontinuing the contacting of step (2);

(4) passing hydrogen over the contaminated catalyst in the substantial absence of added hydrocarbon feedstock or hydrocarbon material and adding a sufficient amount of at least one halogen component to the reaction zone to substantially maintain or increase the concentration of halogen component on the catalyst relative to the lowest catalyst halogen component concentration during the contacting of step (1), the passing of hydrogen over the catalyst being continued at least for a time sufficient to allow the sulfur concentration on the catalyst to be reduced to within desirable limits; and (5) repeating step (1).

Such an embodiment acts to minimize the sulfur contamination and catalytic activity reduction of the catalyst occasioned by the contacting of step (2).

As noted above in step (4), the halogen component concentration on the catalyst is substantially maintained or increased relative to the lowest catalyst halogen component concentration present during step (1). In this context, "substantially maintained" means that the halogen component concentration in step (4) is controlled so that this concentration is equal to at least about 50%, preferably at least about 75% and more preferably at least about 80%, of the lowest halogen concentration on catalyst present during step (1). Of course, the halogen concentration can be increased during step (4). Such catalyst halogen concentration should preferably be less than about 500%, more preferably less than about 300%, of the lowest catalyst halogen concentration present during step (1). In a preferred embodiment, the catalyst halogen concentration during step (2) is at least substantially maintained relative to the lowest catalyst halogen concentration present during step (1). Thus, the catalyst halogen concentration during step (4), and preferably during step (2), is preferably in the range of about 75% to about 500%, more preferably about 80% to about 300%, the lowest catalyst halogen concentration present during step (1).

In a preferred embodiment, the amount of halogen component added to the reactionzone per unit time during step (4) is increased relative to the amount of halogen added, if any, during step (1). The high concentration of water often present in the reaction zone during steps (2) and (4) causes halogen component to be stripped from the catalyst. Therefore, additional increments of halogen component are added during step (4) and preferably during step (2) to substantially maintain or increase the catalyst halogen concentration as noted previously.

The process of the present invention is useful, for example, when hydrocarbon being fed to a reforming reaction zone is inadvertently, or otherwise, contaminated with undesirable amounts of sulfur and water. To illustrate, hydrocarbons which are to be fed to a reforming reaction zone are often subjected to hydrodesulfurization and/or stripping and/or other processes and procedures prior to being sent to the reforming zone so that the sulfur content of this hydrocarbon can be reduced to be compatible with the platinum group metal-containing reforming catalyst. Operation upsets and/or other process variations in the sulfur removal system upstream of the reforming reaction zone may result in a hydrocarbon material having excessive concentrations of sulfur and water being fed to the reforming reaction zone. For example, such high water-containing hydrocarbon feedstocks often include at least about 50 ppm. by weight of water, preferably at least about 100 ppm. by weight of water. The high sulfur-containing and high water-containing, hydrocarbon material contaminates the reforming catalyst with sulfur and causes a rapid and substantial loss in catalytic activity. The present process has been found to be effective to minimize the detrimental effects of such sulfur catalyst contamination. Thus, in one preferred embodiment, a sufficient amount of at least one halogen component is added to the reaction zone for at least a portion of the time during which step (2) occurs and, in particular, during step (4) to maintain and/or increase the concentration of halogen component on the catalyst. Such addition is continued for at least a time sufficient to allow the sulfur concentration on the catalyst to be reduced to within desirable limits. Steps (2) and (4) are preferably carried out at a temperature not substantially higher, e.g., no more than about 30° F. higher, than the highest temperature at which step (1) was carried out. In other words, the temperature within the reaction zone is preferably not substantially increased during steps (2) and (4) relative to the temperature in such zone during step (1). During this hydrogen pass through, the concentration of the halogen component on the catalyst is maintained or increased by the addition of a sufficient amount of at least one halogen component to the reaction zone. If no halogen or an insufficient amount of halogen is added to the reaction zone, the catalyst halogen concentration will not be substantially maintained, e.g., the halogen catalyst component will be stripped away by the excessive amounts of water in the hydrocarbon material, only a substantially reduced portion of the activity is restored to the reforming catalyst. On the other hand, sufficient halogen addition during step (4), and preferably also during step (2), provides for recovery of a significantly greater portion of the activity possessed by the catalyst prior to being contaminated with sulfur, i.e., in step (2) of the present process.

The hydrocarbon feed and hydrocarbon material used in the present process often include hydrocarbon fractions containing naphthenes and paraffins, e.g., boiling within the gasoline range. These hydrocarbon feeds and materials used in steps (1) and (2) may be the same (other than sulfur and water content) or different. Typically, these hydrocarbon feeds and materials may comprise about 20% to about 70% by weight of naphthenes and about 25% to about 75% by weight of paraffins. The preferred hydrocarbons for use as feed and hydrocarbon material consist essentially of naphthenes and paraffins, although in some cases aromatics and/or olefins may also be present. When aromatics are included, these compounds often comprise about 5% to about 25% by weight of the total hydrocarbon material. A preferred class of hydrocarbon feed includes straight run gasolines, natural gasolines, synthetic gasolines and the like. On the other hand, it is frequently advantageous to use as hydrocarbon feed and material thermally or catalytically cracked gasolines or higher boiling fractions thereof, called heavy naphthas. Mixtures of straight run and cracked gasolines can also be used. The gasoline used as hydrocarbon feed and material may be full boiling range gasoline having an initial boiling point of about 50° F. to about 150° F. and an end boiling point within the range of about 325° F. to about 425° F., or may be a selected fraction thereof which generally will be a higher boiling fraction commonly referred to as a heavy naphtha—for example, a naphtha boiling in the range of about $C_7$ to about 400° F. In some cases, it is also advantageous to use pure hydrocarbons or mixtures of hydrocarbons that have been extracted from hydrocarbon distillates—for example, a straight-chain paraffin—which are to be converted to aromatics. It is preferred that at least a portion of the hydrocarbon feed used in step (1) be treated by conventional pretreatment methods, e.g., catalytic hydrotreating and/or various separation procedures, if necessary, to remove substantially all sulfurous and nitrogenous contaminants therefrom. Thus, for example, the hydrocarbon feed to be used in step (1) of the present invention may be substantially completely desulfurized, i.e., have a sulfur content of less than about 1 ppm. by weight. In any event, step (1) of the present invention involves the use of a hydrocarbon feed having a sulfur content less than about 8 ppm., preferably less than about 5 ppm. and more preferably, less than about 1 ppm., by weight based on the total hydrocarbon feed. On the other hand, the hydrocarbon material used in step (2) of the present process preferably has a sulfur content of at least about 10 ppm. and more preferably at least about 50 ppm. and still more preferably at least about 100 ppm. by weight based on the total hydrocarbon material. The sulfur content set forth herein include contributions for sulfur-containing compounds which are chemically combined and/or physically mixed with the hydrocarbon feed and material.

As indicated above, the catalyst utilized in the present invention comprises a solid porous support, e.g., alumina, at least one platinum group metal and at least one halogen component. It is preferred that the solid porous support be a material comprising a major amount of alumina having a surface area of from about 25 $m.^2$/gm. to about 600 $m.^2$/gm. or more. The solid porous support comprises a major proportion, preferably at least about 80%, and more preferably at least about 90%, by weight of the catalyst. The preferred catalyst support, or base, is an alumina derived from hydrous alumina predominating in alumina trihydrate, alumina monohydrate, amorphous hydrous alumina and mixtures thereof; more preferably, alumina monohydrate, amorphous hydrous alumina and mixtures thereof, which alumina when formed as pellets and calcined, has an apparent bulk density of about 0.60 gm./cc. to about 0.85 gm./cc., pore volume of about 0.45 cc./gm. to about 0.70 cc./gm., and surface area of about 100 $m.^2$/gm. to about 500 $m.^2$/gm. The solid porous support may contain, in addition, minor proportions of other well known refractory inorganic oxides such as silica, zirconia, magnesia and the like. However, the most preferred support is substantially pure alumina derived from hydrous alumina predominating in alumina monohydrate, amorphous hydrous alumina and mixtures thereof.

The alumina support may be synthetically prepared in any suitable manner and may be activated prior to use by one or more treatments including drying, calcination, steaming and the like. Thus, for instance, hydrated alumina in the form of a hydrogel can be precipitated from an aqueous solution of a soluble aluminum salt such as aluminum chloride. Ammonium hydroxide is a useful agent for effecting the precipitation. Control of the pH to maintain it within the values of about 7 to about 10 during the precipitation is desirable for obtaining a good rate of conversion. Extraneous ions, such as halide ions, which are introduced in preparing the hydrogel, can, if desired, be removed by filtering the alumina hydrogel from its mother liquor and washing the filter cake with water. Also, if desired, the hydrogel can be aged, say for a period of several days. The effect of such aging is to build up the concentration of alumina trihydrate in the hydrogel. Such trihydrate formation can also be enhanced by seeding an aqueous slurry of the hydrogel with alumina trihydrate crystallites, for example, gibbsite.

The alumina may be formed into macrosize particles of any desired shape such as pills, cakes, extrudates, powders, granules, spheres, and the like using conventional methods. The size selected for the macrosize particles can be dependent upon the intended environment in which the final catalyst is to be used—as, for example, whether in a fixed or moving bed reaction system. Thus, for example, where as in the preferred embodiment of the present invention, the final catalyst is designed for use in hydrocarbon reforming operations employing a fixed bed of catalyst, the alumina will preferably be formed into particles having a minimum dimension of at least about 0.01 inch and a maximum dimension up to about one-half inch or one inch or more. Spherical particles having a diameter of about 0.03 inch to about 0.25 inch, preferably about 0.03 inch to about 0.15 inch, are often useful, especially in a fixed bed reforming operation.

As indicated above, the catalyst utilized in the present invention also contains a platinum group metal. The platinum group metals include platinum, palladium, rhodium, iridium, ruthenium, osmium and the like with platinum being preferred for use in the present invention. The platinum group metal, such as platinum, may exist within the final catalyst at least in part as a compound such as an oxide, sulfide, halide and the like, or in the elemental state. The platinum group metal component preferably comprises about 0.01% to about 3.0%, more preferably about 0.05% to about 1.0%, by weight of the catalyst, calculated on an elemental basis. Excellent results are obtained when the catalyst contains about 0.2% to about 0.9% by weight of the platinum group metal.

The platinum group component may be incorporated in the catalyst in any suitable manner, such as by coprecipitation or cogellation with the alumina support, ion-exchange with the alumina support and/or alumina hydrogel, or by the impregnation of the alumina support and/or alumina hydrogel at any stage in its preparation and either after or before calcination of the alumina hydrogel. One preferred method for adding the platinum group metal to the alumina support involves the utilization of a water soluble compound of the platinum group metal to impregnate the alumina support prior to calcination. For example, platinum may be added to the support by comingling the uncalcined alumina with an aqueous solution of chloroplatinic acid. Other water-soluble compounds of platinum may be employed as impregnation solutions, including, for example, ammonium chloroplatinate and platinum chloride. The utilization of a platinum-chlorine compound, such as chloroplatinic acid, is preferred since it facilitates the incorporation of both the platinum and at least a minor quantity of the halogen component of the catalyst, described hereinafter. It is preferred to impregnate the support with the platinum group metal when it, the support, is in a hydrous state. Following this impregnation, the resulting impregnated support is shaped (e.g., extruded), dried and subjected to a high temperature calcination or oxidation procedure at a temperature in the range of about 700° F. to about 1500° F., preferably of about 850° F. to about 1300° F., for a period of time of about one hour to about 20 hours, preferably of about one hour to about five hours. The major portion of the halogen component may be added to this otherwise fully composited calcined catalyst by contacting this catalyst with a substantially anhydrous stream of halogen-containing gas.

An optional and preferred constituent of the catalyst utilized in the present invention is an additional component exemplified by rhenium. This component may be present as an elemental metal, as a chemical compound, such as the oxide, sulfide, or halide, or in a physical or chemical association with the alumina support and/or the other components of the catalyst. Generally, the rhenium is utilized in an amount which results in a catalyst containing about 0.01% to about 5%, preferably about 0.05% to about 1.0%, by weight of rhenium, calculated as the elemental metal. The rhenium component may be incorporated in the catalyst in any suitable manner and at any stage in the preparation of the catalyst. The procedure for incorporating the rhenium component may involve the impregnation of the alumina support or its precursor either before, during or after the time the other components referred to above are added. The impregnation solution can in some cases be an aqueous solution of a suitable rhenium salt such as ammonium perrhenate, and the like salts or it may be an aqueous solution of perrhenic acid. In addition, aqueous solutions of rhenium halides such as the chloride may be used if desired. It is preferred to use perrhenic acid as the source of rhenium for the catalysts utilized in the present invention. In general, the rhenium component can be impregnated either prior to, simultaneously with, or after the platinum group metal component is added to the support. However, it has been found that best results are achieved when the rhenium component is impregnated simultaneously with the platinum group component. In fact, a preferred impregnation solution contains chloroplatinic acid and perrhenic acid. In the instance where the catalyst support, e.g., alumina derived from hydrous alumina predominating in alumina monohydrate, is formed into spheres using the conventional oil drop method, it is preferred to add the platinum group metal and rhenium after calcination of the spheroidal particles. The presently useful catalyst may include a minor, catalytically effective amount of one or more other well known promotors, such as germanium, tin, gold, cadmium, lead, the rare earth metals and mixtures thereof.

Another essential constituent of the catalyst used in the present invention is a halogen component. Although the precise chemistry of the association of the halogen component with the alumina support is not entirely known, it is customary in the art to refer to the halogen component as being combined with the alumina support, or with the other ingredients of the catalyst. This combined halogen may be fluorine, chlorine, bromine, and mixtures thereof. Of these, fluorine and, particularly, chlorine are preferred for the purposes of the present invention. The halogen may be added to the alumina support in any suitable manner, either during preparation of the support, or before or after the addition of the catalytically active metallic component or components. For example, at least a portion of the halogen may be added at any stage of the preparation of the support, or to the calcined catalyst support, as an aqueous solution of an acid such as hydrogen fluoride, hydrogen chloride, hydrogen bromide and the like or as a substantially anhydrous gaseous stream of these halogen-containing components. The halogen component, or a portion thereof, may be composited with alumina during the impregnation of the latter with the platinum group component and/or rhenium component; for example, through the utilization of a mixture of chloroplatinic acid and/or perrhenic acid and hydrogen chloride. In another situation, the alumina hydrogel which is typically utilized to form the alumina component may contain halogen and thus, contribute at least a portion of the halogen component to the final composite. For purposes of the present invention when the catalyst support is used in the form of an extrudate, it is preferred to add the major portion of the halogen component to the otherwise fully composited calcined catalyst by contacting this catalyst with a substantially anhydrous stream of halogen-containing gas. When the catalyst is prepared by impregnating calcined, formed alumina, for example, spheres produced by the conventional oil drop method, it is preferred to impregnate the support simultaneously with the platinum group metal, rhenium component and halogen. In any event, the halogen is preferably added in such a manner as to result in a fully composited catalyst that contains about 0.1% to about 5% and preferably about 0.2% to about 1.5% by weight of halogen calculated on an elemental basis.

The final fully composited catalyst prepared, for example, by a method set forth above, is generally dried at a temperature of about 200° F. to about 600° F. for a period of about 2 to about 24 hours or more and finally calcined at a temperature of about 700° F. to about 1500° F., preferably about 850° F. to about 1300° F. for a period of about 1 hour to about 20 hours and preferably about 1 hour to about 5 hours.

The resultant calcined catalyst may be subjected to reduction prior to use in reforming hydrocarbons. This step is designed to insure chemical reduction of at least a portion of the metallic components.

The reducing media may be contacted with the calcined catalyst at a temperature of about 800° F. to about 1200° F. and at a pressure in the range of about 0 psig. to about 500 psig. and for a period of time of about 0.5 to about 10 hours or more and, in any event, for a time which is effective to chemically reduce at least a portion, preferably a major portion, of each of the metallic components, e.g., platinum group metal and rhenium component, of the catalyst. By chemical reduction is meant the lowering of oxidation states of the metallic components below the oxidation state of the metallic components in the unreduced catalyst. For example, the unreduced catalyst may contain platinum salts in which the platinum has an oxidation state which can be lowered or even reduced to elemental platinum by contacting the unreduced castalyst with hydrogen. This reduction treatment is preferably performed in situ, (i.e., in the reaction zone in which it is to be used), as part of a start-up operation using fresh unreduced catalyst or regenerated (e.g., regenerated by treatment with an oxygen-containing gas stream) catalyst. The process of the present invention may be practiced using virgin catalyst and/or catalyst that has previously been used to reform hydrocarbon and has been subsequently subjected to conventional treatments to restore, e.g., regenerate and/or reactivate, the hydrocarbon reforming activity and stability of the catalyst.

During step (1), (2), and, in particular, during step (3) of the present invention, the halogen content of the catalyst can be maintained at or increased to the desired level, e.g., in the range of about 0.1% to about 5% and preferably, in the range of about 0.2% to about 1.5% by weight of halogen calculated on an elemental basis, by the addition of one or more of any suitable halogen-containing compounds, such as carbon tetrachloride, ethyl trichloride, t-butyl chloride and the like, to the reaction zone. For example, during step (1), (2) and (3), one or more halogen-containing compounds can be added to the hydrocarbon and/or hydrogen entering the reaction zone. Alternately, halogen-containing compounds can be added to the reaction zone separately from the hydrocarbon feed or hydrogen.

In the reforming embodiment of the present invention, the reaction zone pressure utilized is preferably selected in the range of about 50 psig. to about 1000 psig., with the more preferred pressure being about 100 psig. to about 600 psig. Reforming operations may be conducted at the still more preferred pressure range of about 200 psig. to about 400 psig. to achieve substantially increased catalyst life before regeneration.

For optimum reforming results, the temperature in the reaction zone should preferably be within the range of about 700° F. to about 1100° F. more preferably in the range of about 800° F. to about 1050° F. The initial selection of the temperature within this broad range is made primarily as a function of the desired octane of the product reformate, considering the characteristics of the charge stock and of the catalyst. The temperature may then be slowly increased during the run to compensate for the inevitable deactivation that occurs, to provide a constant octane product.

In accordance with the preferred reforming process of the present invention sufficient hydrogen is supplied to provide about 2.0 to about 20 moles of hydrogen per mole of hydrocarbon entering the reaction zone, with excellent results being obtained when about 7 to about 10 moles of hydrogen are supplied per mole of hydrocarbon charge stock. Likewise, the overall weight hourly space velocity, i.e., WHSV, used in reforming is preferably in the range of about 0.5 to about 10.0 with a value in the range of about 2.0 to about 5.0 being more preferred. Individual reaction zones within a series will, of course, operate at higher WHSV. The preferred ranges of WHSV given above are based on the total or overall reaction zone system.

The following example illustrates more clearly the process of the present invention. However, this illustration is not to be interpreted as a specific limitation on this invention.

EXAMPLE I

A 20,000 barrel a day commercial hydrocarbon reforming unit is operated using a commercially available alumina-based catalyst containing about 0.35% by weight of platinum, about 0.35% by weight of rhenium and about 1% by weight of chlorine. This reforming unit involves four (4) reaction zones in series. The hydrocarbon feedstock to this unit is a naphtha, i.e., gasoline boiling hydrocarbon fraction, which is pretreated, using conventional hydrodesulfurization and separation systems, to provide a reformer feedstock having less than 1 ppm. by weight of sulfur and less than 20 ppm. by weight of water. Chlorine is periodically added to the reaction system, in the form of carbon tetrachloride, to maintain the chloride concentration on the catalyst in the range of about 0.9% to about 1.3% by weight. Conventional reforming conditions are employed within each of the reaction zones. For example, the reaction zones are operated at an average pressure of about 250 psig., with an overall weight hourly space velocity (WHSV) of about 1. Hydrogen-rich gases from the reaction system are recycled back to the reaction zone so that the molar ratio of hydrogen to naphtha entering the first reaction zone is about 7:1. The temperature in each of the reaction zones is maintained so as to provide a liquid reformate product having a research octane number clear of about 98. While operating on this substantially sulfur-free naphtha, the hydrocarbon reforming unit gives satisfactory results.

At one point during the processing cycle, the feedstock pretreatment unit suffers an upset which allows a quantity of feedstock excessively contaminated with sulfur, e.g., containing about 50 to 100 ppm. by weight of sulfur, and water, e.g., containing about 100 to about 500 ppm. by weight of water, to contact the hydrocarbon reforming catalyst. A rapid and substantial loss in catalytic activity is quickly indicated. The catalyst is contaminated with an excessive amount of sulfur.

Corrective action is initiated. The contact between the high sulfur, high water-containing naphtha and the catalyst is discontinued, with the high sulfur, high water-containing feedstock being diverted from the reforming unit to storage. Hydrogen at substantially the same rate as indicated above is continued to be passed over the catalyst to reduce the amount of sulfur on the catalyst.

Hydrogen containing sulfur, is purged from the reaction system and fresh hydrogen-rich gas is added as make-up. The pressure and temperature within the reaction zones are maintained substantially the same as when the sulfur-free naphtha was last contacted with the catalyst. During this hydrogen pass through, an increased amount of carbon tetrachloride (relative to the amount added during the sulfur-free naphtha-catalyst contacting) is added to the reaction zone to maintain the chloride concentration of the catalyst in the range of about 0.9 to about 1.5% by weight.

This procedure is continued until the sulfur contamination has been removed from the catalyst and sustantially sulfur and water-free naphtha is again available. At this point, the sulfur and water-free naphtha is again contacted with the catalyst at hydrocarbon reforming conditions. The catalyst has suffered only a minimum amount of permanent damage, e.g., reduction in catalytic activity, as a result of the pretreatment unit upset which caused high sulfur and high water-containing hydrocarbon feedstock to come in contact with the catalyst.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. An improved hydrocarbon reforming process utilizing a catalyst comprising a major amount of a porous solid support, a minor, catalytically effective amount of at least one platinum group metal, a minor, catalytically effective amount of rhenium, and a minor, catalytically effective amount of at least one halogen, which process comprises:
    (1) contacting a hydrocarbon feedstock with said catalyst in the presence of hydrogen in at least one reaction zone at hydrocarbon reforming conditions including a reforming temperature in the range of about 800°–1050° F.; the hydrocarbon feedstock containing less than about 8 ppm. by weight of sulfur;
    (2) contacting a hydrocarbon material having an undesirably high concentration of sulfur in said reaction zone with said catalyst in the presence of hydrogen at reforming conditions to produce further reformate product and cause said catalyst to be contaminated with an excessive amount of sulfur, and adding at least one halogen component in the reaction zone during at least a portion of the time of said contacting in step 2;
    (3) discontinuing the contacting of step (2);
    (4) passing hydrogen over said contaminated catalyst in the substantial absence of added hydrocarbon feedstock or hydrocarbon material and adding a sufficient amount of at least one halogen component to said reaction zone in the substantial absence of added hydrocarbon material to substantially maintain or increase the concentration of halogen on said catalyst relative to the lowest halogen concentration on the catalyst during the contacting of step (1), said passing of hydrogen and halogen component over said catalyst being continued at least for a time sufficient to allow the sulfur concentration on said catalyst to be reduced to within desirable limits; and
    (5) repeating step (1);
wherein steps (2) and (4) are carried out at a temperature in the range of said reforming temperature and not more than about 30° F. higher than the highest temperature at which step (1) was carried out.

2. The process of claim 1 wherein said hydrocarbon material contains at least about 10 ppm. by weight of sulfur.

3. The process of claim 1 wherein said catalyst used in step (1) contains about 0.01% to about 3.0% by weight of at least one platinum group metal, calculated as elemental metal, and about 0.1% to about 5% by weight of at least one halogen, calculated as elemental halogen.

4. The process of claim 3 wherein halogen component is added to said reaction zone during step (1), said hydrocarbon material contains an undesirably high concentration of water and the amount of halogen component added to the reaction zone per unit time during step (4) is increased relative to the amount of halogen component added during step (1).

5. The process of claim 4 wherein said hydrocarbon feed contains less than about 5 ppm. by weight of sulfur and less than about 20 ppm. by weight of water, and said hydrocarbon material contains at least about 50 ppm. by weight of water.

6. The process of claim 5 wherein said platinum group metal is platinum and said halogen is chorine.

7. The process of claim 6 wherein said solid porous support is alumina.

8. The process of claim 1 wherein said hydrocarbon material contains at least about 100 ppm. by weight of water.

9. The process of claim 3 wherein the catalyst halogen concentration during step (4) is in the range of about 75% to about 500% of the lowest catalyst halogen concentration present during step (1).

10. The process of claim 8 wherein the catalyst halogen concentration during step (4) is in the range of about 75% to about 500% of the lowest catalyst halogen concentration present during step (1).

11. The process of claim 3 wherein the catalyst halogen concentration during steps (2) and (4) is in the range of about 80% to about 300% of the lowest catalyst halogen concentration present during step (1).

12. The process of claim 8 wherein the catalyst halogen concentration during steps (2) and (4) is in the range of about 80% to about 300% of the lowest catalyst halogen concentration present during step (1).

* * * * *